(12) United States Patent
Bodum

(10) Patent No.: US 9,226,610 B2
(45) Date of Patent: Jan. 5, 2016

(54) DOUBLE-WALLED LIQUID CONTAINER

(75) Inventor: Jorgen Bodum, Meggen (CH)

(73) Assignee: PI-DESIGN AG, Triengen (CH)

( * ) Notice: Subject to any disclaimer, the term of this patent is extended or adjusted under 35 U.S.C. 154(b) by 0 days.

(21) Appl. No.: 14/349,115

(22) PCT Filed: Nov. 16, 2011

(86) PCT No.: PCT/CH2011/000274
§ 371 (c)(1),
(2), (4) Date: Apr. 2, 2014

(87) PCT Pub. No.: WO2012/016344
PCT Pub. Date: Feb. 9, 2012

(65) Prior Publication Data
US 2014/0246428 A1    Sep. 4, 2014

(30) Foreign Application Priority Data
Oct. 4, 2011    (CH) ..................... 1623/11

(51) Int. Cl.
B65D 25/54    (2006.01)
A47J 27/21    (2006.01)
A47J 41/00    (2006.01)

(52) U.S. Cl.
CPC ........ *A47J 27/21166* (2013.01); *A47J 41/0055* (2013.01); *A47J 41/0083* (2013.01)

(58) Field of Classification Search
CPC .. B65D 90/501; B65D 90/028; B65D 81/027; B65D 81/3818; B65D 81/383; A47J 27/21166; A47J 41/0055; A47J 41/0083
USPC .............. 220/592.05, 592.16, 592.26, 23.88, 220/23.89
See application file for complete search history.

(56) References Cited

U.S. PATENT DOCUMENTS 3,365,092 A    1/1968    Blessing
3,715,895 A *  2/1973    Devlin .................. 62/457.3
(Continued)

FOREIGN PATENT DOCUMENTS

CN    1765269 A    5/2006
CN    200973622 Y    11/2007
(Continued)

OTHER PUBLICATIONS

International Search Report of PCT/CH2O11/000274 dated May 16, 2012.
(Continued)

*Primary Examiner* — Robert J Hicks
*Assistant Examiner* — Kareen Thomas
(74) *Attorney, Agent, or Firm* — Sughrue Mion, PLLC

(57) ABSTRACT

The invention specifies a double-walled liquid container having an inner side wall (4), an outer side wall (3), which is arranged outside the inner side wall (4), a retaining structure (1) and a fixing element (6), which is fitted on the retaining structure (1). The inner side wall (4) has an upper edge (41) and delimits an interior (9), which serves for accommodating a liquid. The outer side wall (3) has an upper edge (31) and a lower edge (32). The retaining structure (1) has an inner retaining element (162), in which the upper edge (41) of the inner side wall (4) is retained, and an outer retaining element (161), in which the upper edge (31) of the outer side wall (3) is retained. The fixing element (6) here fixes the lower edge (32) of the outer side wall (3) in relation to the retaining structure (1).

19 Claims, 6 Drawing Sheets

(56) References Cited

U.S. PATENT DOCUMENTS

| | | | |
|---|---|---|---|
| 3,752,347 A | 8/1973 | Bell | |
| 3,910,441 A | 10/1975 | Bramming | |
| 4,517,445 A | 5/1985 | Tatsumi et al. | |
| 4,865,014 A * | 9/1989 | Nelson | 122/19.2 |
| 6,352,168 B1 * | 3/2002 | Lin | 220/592.17 |
| 7,091,455 B2 * | 8/2006 | Fung | A47J 27/2105 219/429 |

FOREIGN PATENT DOCUMENTS

| | | |
|---|---|---|
| CN | 201016037 Y | 2/2008 |
| DE | 88 13 591 U1 | 12/1988 |
| DE | 89 08 532 U1 | 8/1989 |
| EP | 0 175 231 A1 | 3/1986 |
| GB | 2 377 751 A | 1/2003 |
| JP | 51-155456 | 6/1950 |
| JP | 57-48826 | 9/1955 |
| JP | 06-189850 A | 7/1994 |
| JP | 11-018947 A | 1/1999 |

OTHER PUBLICATIONS

International Preliminary Report on Patentability, dated Apr. 17, 2014, issued by the International Searching Authority, in counterpart Application No. PCT/CH2011/000274.
Translation of communication dated Jun. 30, 2015, issued by the Japan Patent Office in corresponding Japanese Application No. 2014-533748.

* cited by examiner

DOUBLE-WALLED LIQUID CONTAINER

CROSS REFERENCE TO RELATED APPLICATIONS

This is a National Stage of International Application No. PCT/CH2011/000274 filed Nov. 16, 2011, claiming priority based on Swiss Patent Application No. 1623/11 filed Oct. 4, 2011, the contents of all of which are incorporated herein by reference in their entirety.

TECHNICAL FIELD

The present invention relates to a double-walled liquid container. This can be in particular a water kettle.

PRIOR ART

Liquid containers are known inter alia in the form of insulated containers in which a hot or cold drink can be kept hot or cold over the longest possible period of time. In order to improve the insulation properties, liquid containers of this type usually have a double-walled configuration.

As is disclosed, for example, in DE 89 08 532, double-walled insulated containers are traditionally configured in such a manner that a glass container with a double-walled form throughout is retained in a surrounding sheath. The problem in the case of these liquid containers, however, is the fracture susceptibility of glass and in particular of double-walled glass vessels.

DE 88 13 591 discloses a liquid container in which a first container in the form of a glass body is inserted into a second container produced from plastic. The two containers are in this case retained in a surrounding sheath container.

Another type of liquid containers concerns water kettles with an integrated heating apparatus and also coffee pots to be supported on hot plates. In the case of these liquid containers, the base is usually configured, in contrast to the insulated containers mentioned above, in such a manner that it allows for the best possible thermal conduction of the heat energy to the liquid for heating. In the case of these liquid containers, the base is therefore preferably formed with a single wall.

These liquid containers, too, often have a double-walled side wall. The reason for this is that a material such as, for example, glass or high-grade steel is preferably chosen for the inner wall, this material having advantageous properties for contact with foodstuffs but not being suitable for the production of the outer structure of the liquid container. By way of example, glass is optimally suitable in particular for contact with foodstuffs, since it is odorless and easy to clean. As already mentioned, glass is however susceptible to fracture and has relatively poor molding properties compared to plastic. For this reason, the inner wall is often retained in an outer, sheathing structure, as in the case of the water kettle disclosed in EP 0 175 231, for example.

A further water kettle, in which an inner container is retained in a surrounding structure and at the same time is protected thereby, is disclosed in CN 200973622.

A liquid container of particularly simple construction having a single-walled base, in which an inner wall is retained in a sheath, is disclosed in CN 201016037. The liquid container is an insulated container. The inner wall in this case is pressed against a top seal element attached to the sheath by means of a bottom part which can be screwed onto the sheath, and is thereby fixed in the sheath.

In the case of these double-walled liquid containers with a single-walled base, the outer structure therefore firstly performs a sheath function for protective or insulation purposes and secondly a retaining function with respect to the inner container. Since the outer structure has to perform these two functions at the same time, conflicting demands are made on the configuration thereof, however, particularly with respect to the material selection. A material which, for example, has good protective or insulation properties but which is only poorly moldable and relatively brittle, and therefore is not suitable for performing a retaining function, can therefore not be used for the outer structure.

SUMMARY OF THE INVENTION

It is, therefore, an object of the present invention to specify a double-walled liquid container with a base of any desired configuration, in which the functions for retaining and sheathing the inner side wall can be individually optimized.

Hereinbelow, directional and location details such as upward, downward, above, below, top, bottom, etc. refer in each case to a liquid container which has been assembled as intended and which stands upright on a surface which is horizontal in relation to the direction of gravity. If the liquid container has a spout, this is arranged at the top, while the base of the liquid container is at the bottom. Details such as inner, inward, outer and outward are in each case to be understood in respect of the inner space of the liquid container.

The present invention thus provides a double-walled liquid container having the following features:

- an inner side wall, which has a top edge and delimits an inner space which serves for receiving a liquid;
- an outer side wall, which is arranged outside the inner side wall and has a top edge and a bottom edge;
- a retaining structure having an inner retaining element, in which the top edge of the inner side wall is retained, and an outer retaining element, in which the top edge of the outer side wall is retained; and also
- a fixing element, which is attached to the retaining structure and fixes the bottom edge of the outer side wall in relation to the retaining structure.

The outer and preferably also the inner side wall are therefore fixed in the retaining structure with the aid of the fixing element. Since provision is made of two side walls which are retained with the aid of a fixing element in a retaining structure, a double-walled liquid container which is easy to produce, has a base of any desired configuration and in which the functions of retention and sheathing of the inner side wall are structurally separated is provided. Whereas the outer side wall performs the function of sheathing, the retaining structure serves in particular for retaining the inner side wall. The outer side wall and the retaining structure can be produced from different materials best suited for the respective function. In addition, in particular the retaining structure which is usually best visible from the outside can also have virtually any desired configuration, and in particular can also have openings, windows, etc. Even if the retaining structure does not form a closed sheath around the inner and outer side walls, the inner side wall is nevertheless protected from external influences by the outer side wall.

The shape of the inner side wall defines a longitudinal direction of the liquid container. Preferably, the inner side wall and particularly preferably also the outer side wall have a substantially cylindrical form, as a result of which a radial direction of the liquid container is also defined.

The retaining structure commonly extends along the longitudinal direction of the liquid container both downward and upward beyond the inner and outer side walls. The fixing element is then advantageously attached to the retaining structure below the inner and outer side walls in such a manner that the inner and outer side walls are fixed in position relative to the retaining structure in the longitudinal direction, and are thereby retained firmly in the inner or outer retaining element of the retaining structure. In this respect, the outer side wall can in particular also be clamped in between the outer retaining element of the retaining structure and the fixing element. Similarly, the inner side wall can be clamped in between the inner retaining element of the retaining structure and the fixing element. The fixing element can thus in particular exert a certain contact pressure on the bottom edge of the outer side wall or the outer side wall.

The inner side wall and the outer side wall are preferably each transparent, and the retaining structure is preferably formed in such a manner that the inner space is visible from the outside through the inner side wall and the outer side wall. The retaining structure advantageously has a top base ring, on which the inner and the outer retaining elements are arranged, and a bottom base ring, to which the fixing element can be attached, wherein the two base rings are connected to one another by means of struts. Window openings, through which the inner space of the liquid container is visible, are then present between the base rings and the struts. A handle, which can extend in particular from the top base ring to the bottom base ring, can also be attached to the retaining structure.

It is preferable that the inner side wall is produced from glass and the outer side wall is produced from a plastic such as polycarbonate (PC). It would also be possible, however, to produce the inner side wall from a plastic, for example polycarbonate. Conversely, it would also be conceivable to produce the outer side wall from glass. Glass is very well suited in particular to direct contact with foodstuffs. The production of the outer side wall from a plastic such as polycarbonate is therefore very advantageous, because this material is more resistant, robust and fracture-proof compared to glass. Whereas polycarbonate is a relatively hard and robust material, which is therefore well suited to the sheathing function of the outer side wall, the retaining structure of the liquid container according to the invention can consist of another plastic, which, compared to polycarbonate, is easier to mold and has a higher elasticity and therefore is better suited to performing the retaining function.

In principle, it would be conceivable that the inner side wall is formed so as to be downwardly closed and thereby forms a base which downwardly delimits the inner space. In a preferred embodiment, however, the inner side wall and the outer side wall each substantially have the form of a both upwardly and downwardly open cylinder. As a result, the inner and outer side walls are particularly easy to produce.

Preferably, the inner retaining element is configured as a groove, which in particular can be circumferential. The top edge of the inner side wall is then received in this inner groove. The outer retaining element, too, is preferably configured as a groove, which in particular is circumferential, wherein the top edge of the outer side wall is then received in this outer groove.

The base of the inner space could be formed, for example, by the fixing element. However, the liquid container preferably has a base element, which rests on the fixing element and, together with the inner side wall, delimits the inner space of the liquid container. The base element is in this respect preferably arranged, in particular clamped in, between the fixing element and a bottom edge of the inner side wall. The inner side wall is then arranged between the inner retaining element of the retaining structure and the base element and rests in particular on the base element.

In a particularly preferred embodiment, the liquid container is a water kettle having a heating apparatus. In this case, the base element preferably forms a heating plate, which is connected to the heating apparatus. The base element is then usually produced from a material of good thermal conductivity, preferably a metal, and can in particular have a heating coil attached to the bottom side. However, a thin film heating element can also be involved, for example.

Preferably, the base element has an inner groove, into which the inner side wall extends. This firstly fixes the inner side wall between the inner retaining element of the retaining structure and the base element and secondly fixes the base element between the inner side wall and the fixing element. Moreover, the base element and the inner side wall are each also fixed in the radial direction. The inner groove of the base element advantageously has a circumferential form.

Preferably, a sealing compound is provided in the inner retaining element of the retaining structure and/or in the inner groove of the base element and seals the inner side wall with respect to the retaining structure or with respect to the base element in a liquid-tight manner. This sealing compound can be, in particular, an adhesive, for example Loctite™.

Advantageously, at least one support element produced from a significantly more flexible material compared to the inner side wall and to the fixing element is arranged between the inner side wall and the fixing element, and therefore this support element is suitable for compensating for manufacturing tolerances with respect to the dimensioning of the length of the inner side wall. The support element, which can be produced in particular from silicone, is in this respect preferably attached to the fixing element. It is preferable that the support element is in this case formed as a support plug, which extends in the longitudinal direction of the liquid container through an opening formed on the fixing element and has a support face turned toward the bottom edge of the inner side wall. If a base element is arranged between the inner retaining element of the retaining structure and the fixing element, this base element preferably lies on the at least one support element.

Advantageously, the fixing element and the retaining structure together delimit an outer groove, into which the outer side wall extends. The outer side wall is thereby also fixed in the radial direction. Preferably, this outer groove delimited by the fixing element and the retaining structure together has a lateral inner face which is formed on the fixing element and is inclined relative to the longitudinal direction of the liquid container, such that the outer side wall is pressed radially outward by the fixing element.

In a preferred embodiment, the fixing element is formed as a fixing ring. The latter advantageously has an external diameter which corresponds substantially to that of the outer side wall. It is particularly preferable that the fixing ring has an outer side which bears, in particular circumferentially, against the inner side of the retaining structure. One or more structures having, if the liquid container has support elements, openings for receiving these support elements are preferably attached to the inner side of the fixing ring.

Advantageously, the retaining structure is formed so as to be downwardly open, wherein the fixing element can be introduced into the retaining structure from below during the production of the liquid container. This allows for particularly simple production of the liquid container, in that firstly the inner and outer side walls are inserted into the retaining structure and then are fixed from below with the fixing element.

If the retaining structure is formed so as to be downwardly open, the liquid container preferably has a bottom end plate for closing off the retaining structure in the downward direction. In principle, the fixing element could form this end plate. Advantageously, however, provision is made of a separate end plate, which is preferably fastened to the fixing element. It is particularly preferable for the end plate to be fastened to the fixing element by means of screws. If the fixing element is configured as a fixing ring with structures attached to the inner side, sleeves each with an internal thread can be provided, for example, on these structures, which are then fastening structures. If the liquid container is a water kettle, a plug connection in particular can be provided in the end plate, in order to be able to connect the liquid container to a connection base connected to the electrical mains in a simple manner. The liquid container then has an internal electrical connection, which connects the plug connection of the end plate to the heating apparatus.

Preferably, the fixing element has at least a first latching structure and the retaining structure has at least a second latching structure, these being formed complementarily to one another in such a manner that the fixing element can be latched into the retaining structure. This makes it possible to achieve particularly simple assembly of the fixing element on the retaining structure. The latching structures can here be formed in such a manner that the fixing element, once fastened on the retaining structure for the first time, can only be removed again from the retaining structure by means of destruction. The latching structures can be in particular latching notches and latching lugs.

The liquid container can have a lid in order to close off the inner space to the outside. The lid can be attached in particular pivotably to the retaining structure.

Moreover, the retaining structure can have a spout, in order to pour the liquid out of the inner space. It is preferable that this spout is formed in the region of a top edge of the retaining structure.

BRIEF DESCRIPTION OF THE DRAWINGS

Preferred embodiments of the invention which serve merely for explanation and are not to be interpreted as having a limiting effect will be described hereinbelow on the basis of the drawings, in which.

Figure 1:
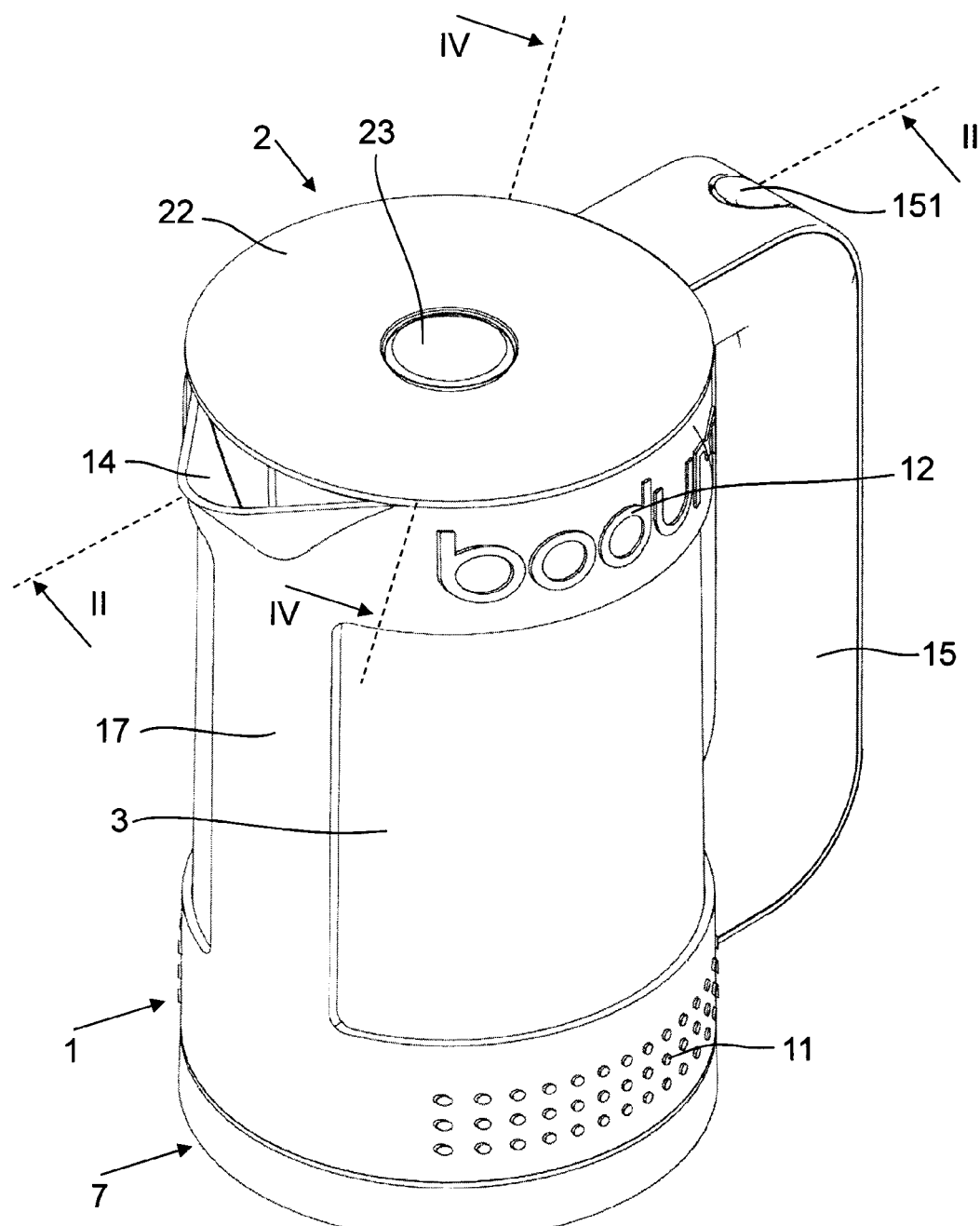
FIG. 1 shows a perspective view of a double-walled liquid container according to a first embodiment according to the invention.

DESCRIPTION OF PREFERRED
EMBODIMENTS

FIGS. 1 to 7 show a first embodiment according to the invention of a double-walled liquid container, which here is formed as a water kettle. The liquid container has a retaining structure 1, an outer side wall 3, an inner side wall 4 and a fixing ring 6, which serves to fasten the two side walls 3 and 4 to the retaining structure 1. Here, the two concentrically arranged side walls 3 and 4 are fixed by the fixing ring 6 in top grooves 161 and 162, which are formed on the retaining structure 1 and thus form retaining elements. Together with a heating plate 5, the inner side wall 4 delimits an inner space 9 of the water kettle, which serves to receive a liquid or water in this case.

The retaining structure 1 of the water kettle can be readily identified in particular in FIG. 1. In the present exemplary embodiment, the retaining structure has a bottom base ring 11 and a top base ring 12, which are connected to one another via connection webs 17. Window openings are formed between the base rings 11 and 12 and the connection webs 17. These can be of any desired configuration, but here each have a rectangular shape. The retaining structure 1 has a spout 14 for pouring out the liquid, which here is arranged on the top edge of the top base ring 12. Moreover, a handle 15 is attached to the retaining structure 1, on which handle there can be arranged a push-button 151 for switching the water kettle on and off and also a status display 152 for displaying the operating status of the water kettle.

Figure 2:
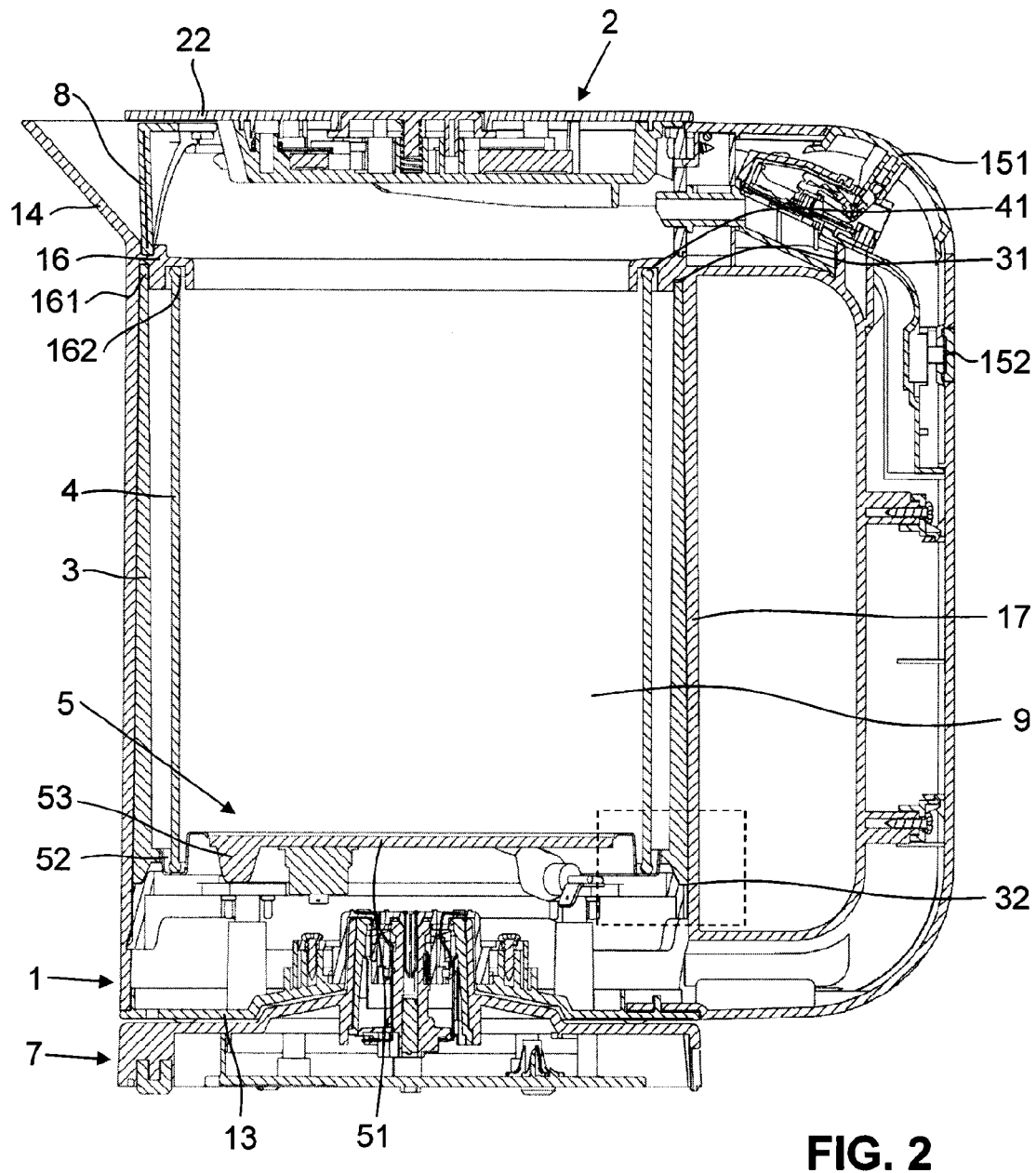
FIG. 2 shows a central sectional view in plane II-II through the liquid container shown in FIG. 1.

As shown in FIG. 2, the retaining structure 1 is formed so as to be upwardly and downwardly open. A configuration of this type makes it possible to introduce the side walls 3 and 4 from below into the retaining structure 1, for example, during the production of the liquid container. Similarly, the heating plate 5 and the fixing ring 6 can be introduced into the retaining structure 1 during the production, before the latter is downwardly closed off by an end plate 13. As is commonly provided in the case of water kettles, the end plate 13 has a central plug connection, in order to be able to establish an electrical connection with a connection base 7 that can be connected to the electrical mains for heating the water. Plug connections of this type are well known in the prior art.

The retaining structure 1 has in particular a fastening structure 16, which is arranged directly below the spout 14 on the top base ring 12 and protrudes radially into the interior of the retaining structure 1. The downwardly open, inner groove 162, which serves to receive the top edge 41 of the inner side wall 4, is formed on the fastening structure 16. The inner groove 162 in this case has a circumferential form. In addition, together with the inner face of the top base ring 12, the fastening structure 16 forms a likewise downwardly open, outer groove 161, which here likewise has a circumferential form and which serves to receive the top edge 31 of the outer side wall 3.

Figure 3:
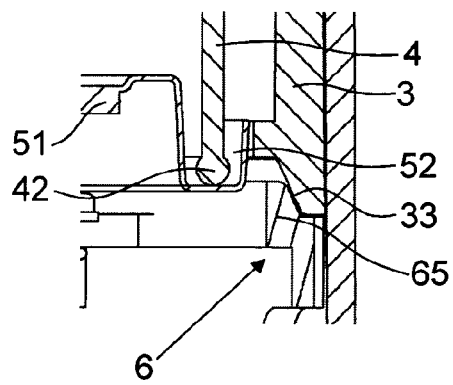
FIG. 3 shows an enlarged illustration of the region indicated by dashed lines in FIG. 2.
Figure 4:
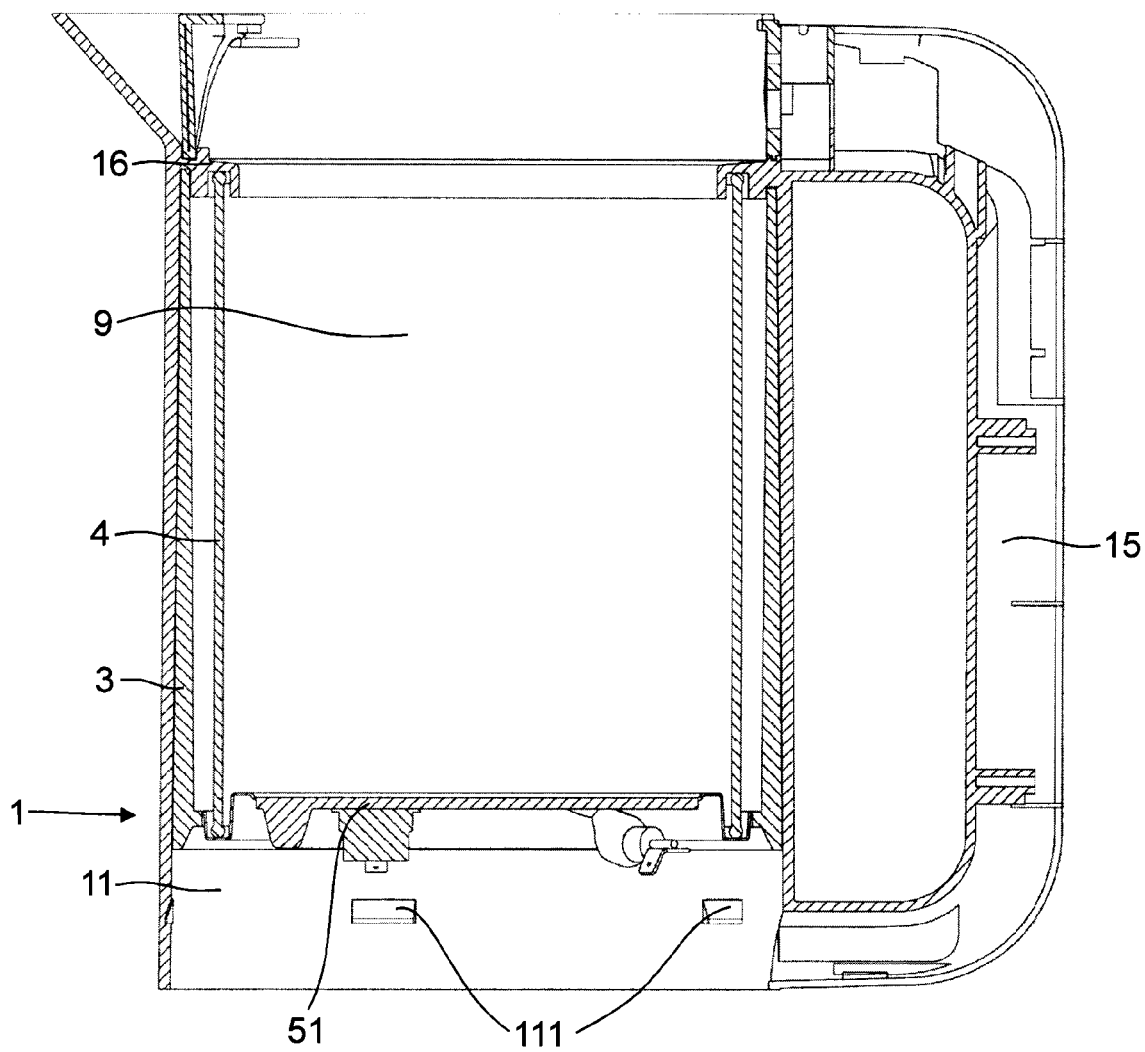
FIG. 4 shows a central sectional view in plane II-II through the liquid container shown in FIG. 1, without a connection base, an end plate and a fixing ring.

It is apparent from FIG. 4 that the bottom base ring 11 of the retaining structure 1 has latching notches 111 on its inner side. In the case of the water kettle shown in FIGS. 1 to 7, five latching notches 111 are present. It goes without saying that more or fewer than five latching notches 111 can also be provided. The latching notches 111 serve to fasten the fixing ring 6 on the retaining structure 1.

A pivotable lid 2 having a lid face 22 for closing off the inner space 9 is attached to the retaining structure 1. A push-button 23 is provided on the lid 2. The lid 2 is connected to the retaining structure 1 via a spring in such a manner that it automatically pivots upward when the push-button 23 is operated. A screen insert 8 is provided in the region of the spout 14 and holds back solid constituents such as, for example, detached limescale when pouring out the liquid.

The retaining structure 1 is preferably produced in one piece from a plastic in an injection molding process.

The outer side wall 3, which can be identified in FIGS. 2 to 6, has a substantially hollow cylindrical configuration and is formed so as to be upwardly and also downwardly open. In the present exemplary embodiment, as is apparent from FIG. 3, the bottom end region of the side wall 3 is provided with a circumferential, beveled inner face 33, which is accompanied by tapering of the wall thickness of the outer side wall 3 downward toward the bottom edge 32. A circumferential, radially inwardly projecting shoulder is formed directly above this beveled inner face 33 and serves for centering the heating plate 5.

In order that the inner space 9 is visible to the user from the outside, the outer side wall 3 is preferably produced from a transparent material. In order to increase the fracture resistance, this is preferably a plastic, such as in particular polycarbonate (PC).

The inner side wall 4, which can be identified in FIGS. 2 to 6, has a substantially hollow cylindrical configuration and is formed so as to be both upwardly and downwardly open. It has a top edge 41 and a bottom edge 42, which both form a circumferential bead.

The inner side wall 4 preferably has a transparent form. As a result, the inner space 9 is visible from the outside. Since the inner side wall 4 comes into contact with the water received in the inner space 9, it is particularly preferably produced from glass. Alternatively, however, it could also be produced from high-grade steel, for example.

The heating plate 5, which has a base face 51, forms a base element in relation to the inner space 9. A heating coil 53 is attached to the bottom side of the heating plate 5 and serves for heating the liquid received in the inner space 9. The base face 51 is surrounded by a circumferential, upwardly open groove 52. The groove 52 serves for receiving the bottom edge 42 of the inner side wall 4. In the present exemplary embodiment, the groove 52 is arranged offset slightly underneath the base face 51.

The heating plate 5 is conventionally produced from a material of good thermal conductivity, such as in particular a metal.

Figure 7:
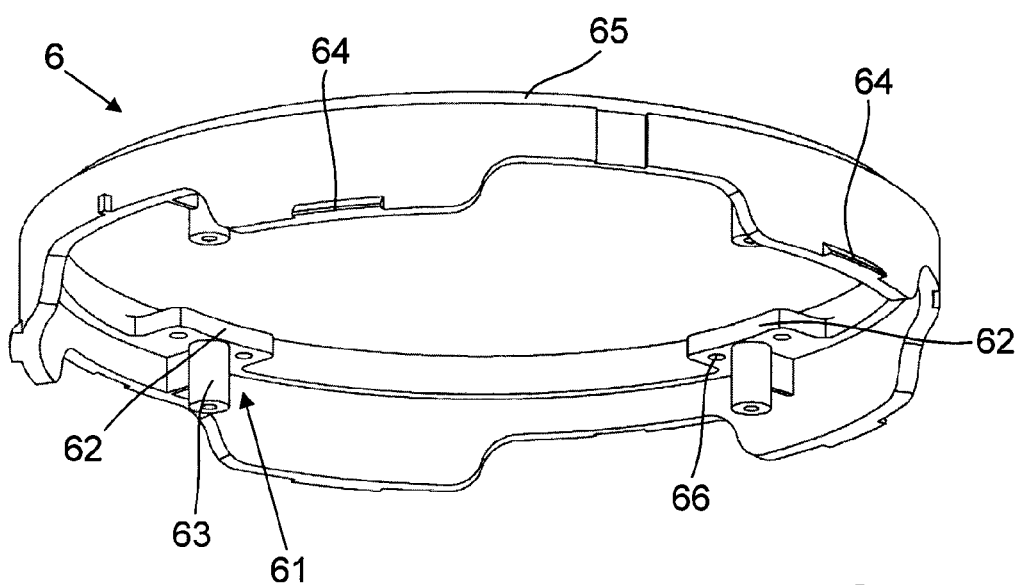
FIG. 7 shows a perspective view from obliquely below the fixing ring of the liquid container shown in FIG. 1.

The configuration of the fixing ring 6 is readily apparent in particular from FIG. 7. The fixing ring 6 has an annular shape and is in this case dimensioned in such a manner that it bears by way of its outer face, as shown in FIG. 2, against the inner face of the bottom base ring 11 of the retaining structure 1. In order to fasten the fixing ring 6 in this position on the retaining structure 1, the outer side of the fixing ring is provided with latching lugs 64, which are formed complementarily in terms of their number, arrangement and configuration to the latching notches 111 of the retaining structure 1. The fixing ring 6 is thereby designed to enter into a latching connection with the retaining structure 1. Here, the latching lugs 64 each have a bottom side which extends in the radial direction perpendicular to the adjoining inner wall of the base ring 11. The top side of the latching lugs 64 is, by contrast, formed inclined relative to the longitudinal direction and to the radial direction, such that the fixing ring 6 easily latches in upon insertion into the retaining structure 1. Preferably, after latching in for the first time, this latching connection can only be separated again by means of destruction. The interior of the water kettle between the heating plate 5 and the end plate 13 can thereby be made inaccessible to the user.

The fixing ring 6 extends in each case slightly further downward into the regions of the latching lugs 64 than into the interlying regions. Whereas the top edge of the fixing ring 6 runs in a single plane, the bottom edge thereby describes a wavelike form.

Toward the top, the fixing ring 6 has a circumferential pressure element 65, which is readily apparent in cross section in particular in FIGS. 2 and 3. The pressure element 65 is attached to the inner wall of the fixing ring 6 in the region of the top edge thereof and extends from there beyond the top edge upward. The outer face of the pressure element 65, which extends from the top edge of the fixing ring, has such an inclination in cross section that it moves upward away from the inner wall of the bottom base ring 11 of the retaining structure 1. Together with the inner wall of the bottom base ring 11, the pressure element 65 of the fixing ring 6 thus forms a bottom groove, which has a complementary configuration compared to the bottom end region of the outer side wall 3. This bottom groove therefore serves for receiving the bottom edge 32 of the outer side wall 3. The angular faces of the pressure element 65 and of the bottom end region of the outer side wall 3 in this case have the effect that the outer side wall is pressed both upward and radially outward. The top edge of the fixing ring 6 serves to support the bottom edge 32 of the outer side wall 3.

Inwardly protruding fastening structures 61 are attached to the inner side of the fixing ring 6 at regular intervals. In the present exemplary embodiment, provision is made of four fastening structures 61, but of course more or fewer can also be present. The fastening structures 61 each have a connection plate 62, which extends inward perpendicular to the inner face of the fixing ring 6 and on the bottom side of which there is attached a downwardly extending sleeve with an internal thread. The sleeve 63 can be connected to the inner face of the fixing ring 6 via a radially running reinforcement strut. The sleeves 63 serve to connect the fixing ring 6 to the end plate 13 by means of screws. It is preferable that the fixing ring 6 is produced in one piece from a plastic in an injection molding process.

Figure 5:
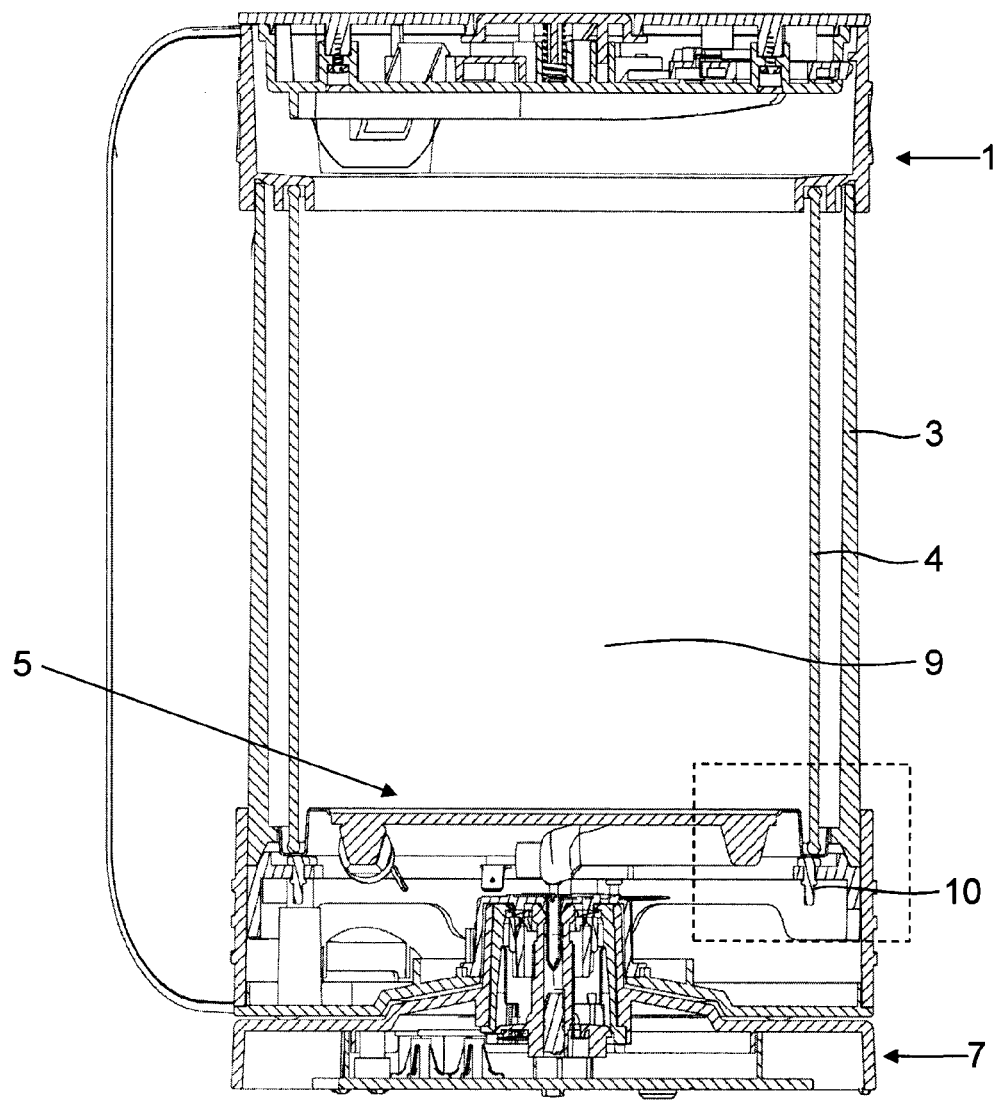
FIG. 5 shows a central sectional view in plane IV-IV through the liquid container shown in FIG. 1.
Figure 6:
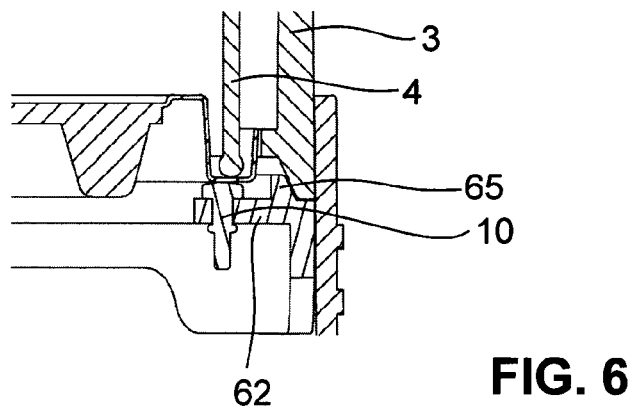
FIG. 6 shows an enlarged illustration of the region indicated by dashed lines in FIG. 5.

Two openings 66 are formed in each case in the connection plate 62 of the fastening structures 61 and are arranged in each case in front of and behind the sleeve 63 in the circumferential direction. The openings 66 serve to receive support plugs 10. These support plugs 10 are produced from a flexible material compared to the fixing ring 6. This is preferably silicone. As can be seen in FIGS. 5 and 6, the support plugs 10 serve to support the heating plate 5. It goes without saying that it would also be possible, in an alternative embodiment, that the inner side wall would lie with its bottom edge 42 directly on the support plugs 10. Owing to their flexible configuration, the support plugs 10 in this case serve in particular for compensating for certain manufacturing tolerances with respect to the dimensioning of the inner side wall 4, so that the fixing ring 6 nevertheless exerts a certain contact pressure on the bottom edge 42 of the inner side wall 4.

During the production of the liquid container, the inner side wall 4 and the outer side wall 3 are inserted into the inner groove 162 and respectively the outer groove 161 of the retaining structure 1. The heating plate 5 is then introduced into the retaining structure 1 from below in such a manner that the circumferential groove 52 of the heating plate 5 receives the bottom edge 42 of the inner side wall 4. Then, the fixing ring 6 is latched or snapped into the latching notches 111 by way of its latching lugs 64. The outer side wall 3 and the inner side wall 4 are thereby fixed between the fastening structure 16 of the retaining structure 1 and the fixing ring 6. In addition, in this exemplary embodiment, the heating plate 5 is also fixed between the fixing ring 6 and the fastening structure 16 or the inner side wall 4. Finally, the retaining structure 1 is closed off at the bottom by means of the end plate 13, by screwing the end plate 13 onto the fixing ring 6. Alternatively, it would also be possible to screw the end plate 13 onto the fixing ring 6 even before the fixing ring 6 is inserted into the retaining structure, or to connect the end plate to the fixing ring in another way, for example by adhesive bonding, welding, etc.

Sealing compounds are preferably provided in the inner groove 162 of the retaining structure 1 and in the groove 52 of the heating plate 5 and seal the inner side wall 4 with respect to the retaining structure 1 or the heating plate 5 in a liquid-tight manner. These sealing compounds are preferably an adhesive, for example Loctite™. Similarly, a sealing compound, preferably in the form of an adhesive, for example Loctite™, can be provided in each case in the outer groove 161 of the retaining structure 1 and in the bottom groove formed by the fixing ring 6 and the retaining structure 1 together.

Figure 8:
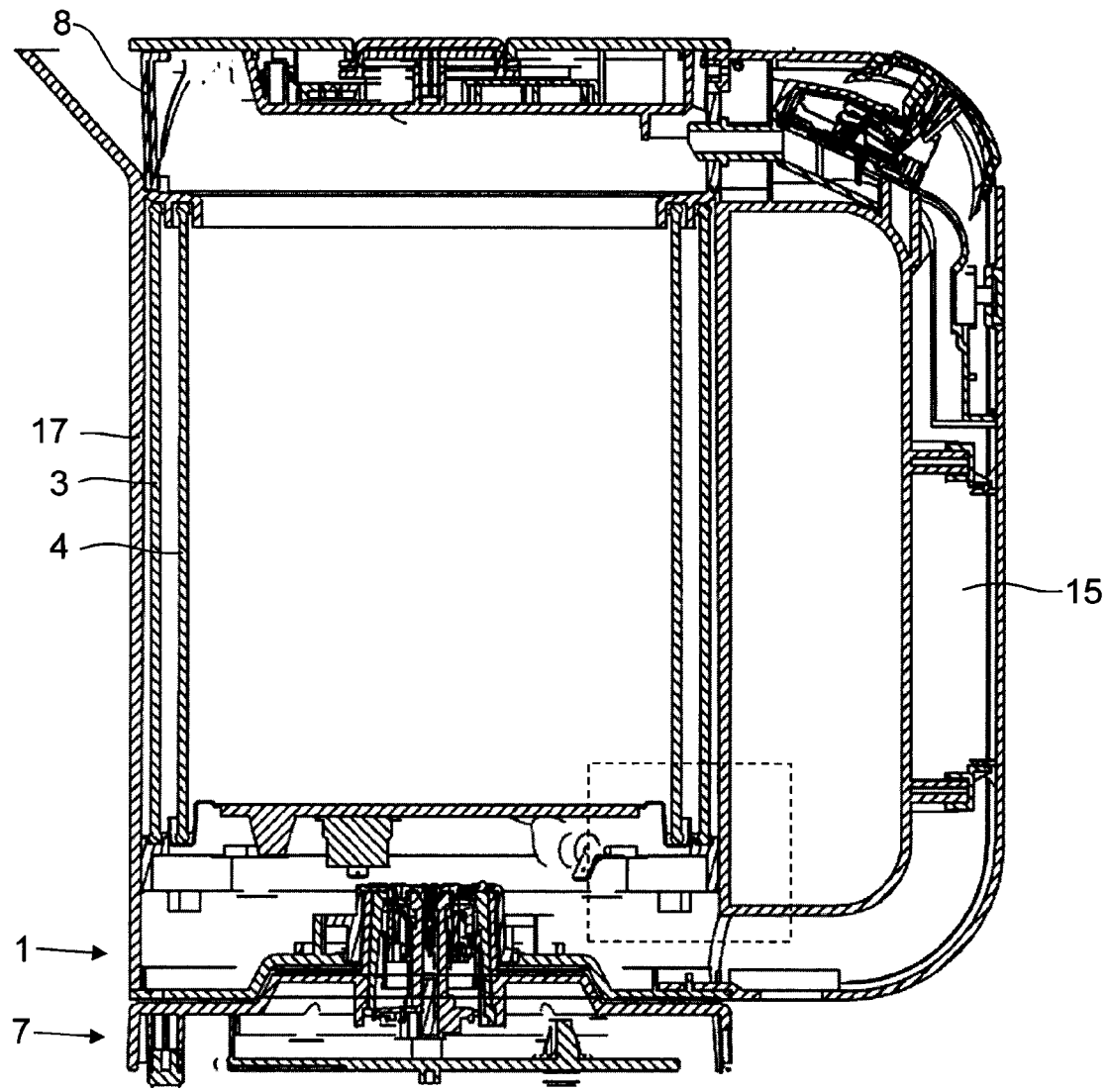
FIG. 8 shows a central sectional view through a double-walled liquid container according to a second embodiment according to the invention.
Figure 9:
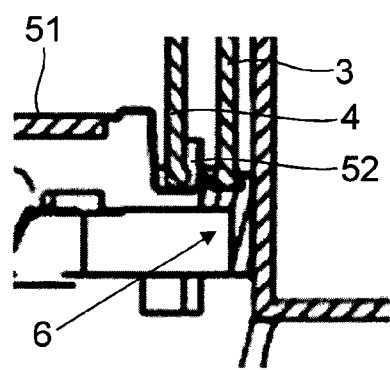
FIG. 9 shows an enlarged illustration of the region indicated by dashed lines in FIG. 8.

FIGS. 8 and 9 show a further embodiment of a liquid container according to the invention. In contrast to the embodiment shown in FIGS. 1 to 7, here the fixing ring 6 alone, and not together with the inner face of the retaining structure 1, forms the bottom groove for the bottom edge 32 of the outer side wall 3. Just like the inner side wall 4, the outer side wall 3 additionally has a circumferential bead in each case in the region of its top edge 31 and its bottom edge 32.

The invention is of course not limited to the above exemplary embodiments, and a multiplicity of modifications are possible. Thus, by way of example, the heating plate does not necessarily have to be fixed between the inner side wall 4 and the fixing ring 6, but rather could also be attached to the retaining structure or to the inner side wall in any other desired way. The liquid container does not necessarily have to be formed as a water kettle. The inner and outer side walls could each also lie with their bottom edges on the end plate, which would then form the fixing element. The roles of the latching notches and latching lugs on the retaining structure and on the fixing element can of course also be interchanged. A multiplicity of further modifications is possible.

LIST OF REFERENCE SIGNS

| | | | |
|---|---|---|---|
| 1 | Retaining structure | | |
| 11 | Bottom base ring | 4 | Inner side wall |
| 111 | Latching notch | 41 | Top edge |
| 12 | Top base ring | 42 | Bottom edge |
| 13 | End plate | | |
| 14 | Spout | 5 | Heating plate |
| 15 | Handle | 51 | Base face |
| 151 | Push-button | 52 | Groove |
| 152 | Status display | 53 | Heating coil |
| 16 | Fastening structure | | |
| 161 | Outer groove | 6 | Fixing ring |
| 162 | Inner groove | 61 | Fastening structure |
| 17 | Connection web | 62 | Connection plate |
| | | 63 | Sleeve |
| 2 | Lid | 64 | Latching lug |
| 22 | Lid face | 65 | Pressure element |
| 23 | Push-button | 66 | Opening |
| 3 | Outer side wall | 7 | Connection base |
| 31 | Top edge | 8 | Screen insert |
| 32 | Bottom edge | 9 | Inner space |
| 33 | Beveled inner face | 10 | Support plug |

The invention claimed is:

1. A double-walled liquid container, comprising
an inner side wall, which has a top edge and delimits an inner space which serves for receiving a liquid,
an outer side wall, which is arranged outside the inner side wall and has a top edge and a bottom edge,
a retaining structure being formed so as to be downwardly open and having an inner retaining element, in which the top edge of the inner side wall is retained, and an outer retaining element, in which the top edge of the outer side wall is retained, and also
a fixing element, which is attached to the retaining structure and fixes the bottom edge of the outer side wall in relation to the retaining structure, and which can be introduced into the retaining structure from below during the production of the liquid container.

2. The double-walled liquid container as claimed in claim 1, wherein the inner side wall and the outer side wall are each transparent, and the retaining structure is formed in such a manner that the inner space is visible from the outside through the inner side wall and the outer side wall.

3. The double-walled liquid container as claimed in claim 1, wherein the inner side wall is produced from glass and the outer side wall is produced from polycarbonate (PC).

4. The double-walled liquid container as claimed in claim 1, wherein the inner side wall and the outer side wall each substantially have the form of an upwardly and downwardly open cylinder.

5. The double-walled liquid container as claimed in claim 1, wherein the inner retaining element and the outer retaining element are each configured as a circumferential groove.

6. The double-walled liquid container as claimed in claim 1, wherein the liquid container has a base element, which rests on the fixing element and, together with the inner side wall, delimits the inner space.

7. The double-walled liquid container as claimed in claim 6, wherein the inner side wall has a bottom edge, and wherein the base element is arranged between the fixing element and the bottom edge of the inner side wall.

8. The double-walled liquid container as claimed in claim 6, wherein the liquid container is a water kettle having a heating apparatus, and wherein the base element forms a heating plate, which is connected to the heating apparatus.

9. The double-walled liquid container as claimed in claim 6, wherein the base element has an inner groove, into which the inner side wall extends.

10. The double-walled liquid container as claimed in claim 9, wherein a sealing compound is provided in the inner retaining element of the retaining structure and/or in the inner groove of the base element and seals the inner side wall with respect to the retaining structure or with respect to the base element in a liquid-tight manner.

11. The double-walled liquid container as claimed in claim 10, wherein said sealing compound is an adhesive.

12. The double-walled liquid container as claimed in claim 1, wherein the fixing element is formed as a fixing ring having an external diameter which corresponds substantially to the external diameter of the outer side wall.

13. The double-walled liquid container as claimed in claim 1, moreover comprising a bottom end plate for closing off the retaining structure in a downward direction, wherein the end plate is fastened to the fixing element.

14. The double-walled liquid container as claimed in claim 1, wherein the fixing element has at least a first latching structure and the retaining structure has at least a second latching structure, these being formed complementarily to one another in such a manner that the fixing element can be latched into the retaining structure.

15. The double-walled liquid container as claimed in claim 1, wherein the retaining structure has a spout, in order to pour a liquid out of the inner space.

16. A double-walled liquid container, comprising:
an inner side wall, which has a top edge and delimits an inner space which serves for receiving a liquid, an outer side wall, which is arranged outside the inner side wall and has a top edge and a bottom edge, a retaining structure having an inner retaining element, in which the top edge of the inner side wall is retained, and an outer retaining element, in which the top edge of the outer side wall is retained, and also a fixing element, which is attached to the retaining structure and fixes the bottom edge of the outer side wall in relation to the retaining structure, wherein at least one support element produced from a significantly more flexible material compared to the inner side wall and to the fixing element is arranged between the inner side wall and the fixing element.

17. A double-walled liquid container, comprising:

an inner side wall, which has a top edge and delimits an inner space which serves for receiving a liquid, an outer side wall, which is arranged outside the inner side wall and has a top edge and a bottom edge, a retaining structure having an inner retaining element, in which the top edge of the inner side wall is retained, and an outer retaining element, in which the top edge of the outer side wall is retained, and also a fixing element, which is attached to the retaining structure and fixes the bottom edge of the outer side wall in relation to the retaining structure, wherein the fixing element and the retaining structure together delimit an outer groove, into which the outer side wall extends.

18. A double-walled liquid container, comprising an inner side wall, which has a top edge and delimits an inner space which serves for receiving a liquid, an outer side wall, which is arranged outside the inner side wall and has a top edge and a bottom edge, a retaining structure having an inner retaining element, in which the top edge of the inner side wall is retained, and an outer retaining element, in which the top edge of the outer side wall is retained, a fixing element, which is attached to the retaining structure and fixes the bottom edge of the outer side wall in relation to the retaining structure, and a base element, which rests on the fixing element and, together with the inner side wall, delimits the inner space, wherein the inner side wall has a bottom edge, and wherein the base element is arranged between the fixing element and the bottom edge of the inner side wall.

19. A double-walled liquid container, comprising an inner side wall, which has a top edge and delimits an inner space which serves for receiving a liquid, an outer side wall, which is arranged outside the inner side wall and has a top edge and a bottom edge, a retaining structure having an inner retaining element, in which the top edge of the inner side wall is retained, and an outer retaining element, in which the top edge of the outer side wall is retained, a fixing element, which is attached to the retaining structure and fixes the bottom edge of the outer side wall in relation to the retaining structure, and a base element, which rests on the fixing element and, together with the inner side wall, delimits the inner space, wherein the liquid container is a water kettle having a heating apparatus, and wherein the base element forms a heating plate, which is connected to the heating apparatus.

* * * * *